United States Patent
Huang et al.

(10) Patent No.: US 12,451,198 B2
(45) Date of Patent: Oct. 21, 2025

(54) IN-MEMORY READ THRESHOLD ADAPTATION

(71) Applicant: SK hynix Inc., Gyeonggi-do (KR)

(72) Inventors: Pengfei Huang, San Jose, CA (US); Fan Zhang, Fremont, CA (US)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/403,019

(22) Filed: Jan. 3, 2024

(65) Prior Publication Data

US 2025/0218523 A1  Jul. 3, 2025

(51) Int. Cl.
*G11C 16/34* (2006.01)
*G11C 29/12* (2006.01)
(Continued)

(52) U.S. Cl.
CPC ...... *G11C 16/3404* (2013.01); *G11C 29/1201* (2013.01); *G11C 29/18* (2013.01); *G11C 29/42* (2013.01); *G11C 2029/1802* (2013.01)

(58) Field of Classification Search
CPC ............. G06F 11/1048; G06F 11/1012; G06F 11/1068; G06F 11/1072; G06F 3/0619; G06F 3/064; G06F 11/076; G06F 11/0772; G06F 11/1076; G06F 3/061; G06F 3/0659; G06F 3/0673; G06F 3/0679; G06F 3/0688; G11C 16/26; G11C 29/52; G11C 11/5642; G11C 16/3404; G11C 2029/0411; G11C 13/0033; G11C 13/004; G11C 16/0483;
(Continued)

(56) References Cited

U.S. PATENT DOCUMENTS 8,514,646 B1   8/2013 Nan
8,947,958 B2   2/2015 Mu et al.
(Continued)

FOREIGN PATENT DOCUMENTS

CN   109473139 A   3/2019
CN   114038494 A   2/2022
(Continued)

OTHER PUBLICATIONS

M. Rajab, J.-P. Thiers and J. Freudenberger, "Read Threshold Calibration for Non-Volatile Flash Memories," 2019 IEEE 9th International Conference on Consumer Electronics (ICCE-Berlin), Berlin, Germany, 2019.*
(Continued)

*Primary Examiner* — Steve N Nguyen
(74) *Attorney, Agent, or Firm* — Weaver Austin Villeneuve & Sampson LLP

(57) ABSTRACT

A memory device of a storage device may perform a test read of the memory device for each entry of a set of entries of an in-memory history read retry (HRR) table using a set of read thresholds corresponding to that entry. The memory device may identify an entry in the set of entries having a lowest failed bit count (FBC) obtained from the test read of each entry, and update the in-memory HRR table to have the identified entry with the lowest FBC be at a beginning of the in-memory HRR table. The memory device may also notify a memory controller coupled to the memory device to update an in-controller HRR table stored in the memory controller based on the update to the in-memory HRR table.

20 Claims, 9 Drawing Sheets

(51) Int. Cl.
*G11C 29/18* (2006.01)
*G11C 29/42* (2006.01)

(58) Field of Classification Search
CPC ............... G11C 16/28; G11C 16/3427; G11C 2029/0409; G11C 29/42; H03M 13/1125; H03M 13/6325; H03M 13/1111; H03M 13/1114; H03M 13/2957; H03M 13/45
See application file for complete search history.

(56) References Cited

U.S. PATENT DOCUMENTS

| | | | |
|---|---|---|---|
| 9,812,193 B2* | 11/2017 | Tsang | G11C 16/3404 |
| 10,468,117 B2 | 11/2019 | Chen et al. | |
| 10,529,432 B2* | 1/2020 | Park | G06F 3/064 |
| 10,552,259 B2 | 2/2020 | Jacobvitz et al. | |
| 10,943,669 B2* | 3/2021 | Zhang | G11C 29/028 |
| 11,037,646 B2* | 6/2021 | Kim | G06F 3/0688 |
| 11,189,350 B2* | 11/2021 | Jeon | G06F 11/1068 |
| 11,249,685 B2 | 2/2022 | Lin | |
| 11,393,539 B2 | 7/2022 | Bhatia et al. | |
| 11,467,938 B2 | 10/2022 | Asadi et al. | |
| 11,482,263 B2 | 10/2022 | Park et al. | |
| 11,699,500 B2 | 7/2023 | Lee et al. | |
| 11,726,709 B2* | 8/2023 | Zeng | G06F 11/1012 |
| | | | 711/103 |
| 11,756,635 B2 | 9/2023 | Xie et al. | |
| 11,860,733 B2* | 1/2024 | Sharon | H03M 13/1111 |
| 11,973,516 B2* | 4/2024 | Xiong | H03M 13/1125 |
| 2009/0310408 A1* | 12/2009 | Lee | G11C 16/0483 |
| | | | 365/185.09 |
| 2013/0080858 A1 | 3/2013 | Lee et al. | |
| 2014/0258590 A1* | 9/2014 | Kochar | G11C 16/3422 |
| | | | 711/103 |
| 2015/0194983 A1* | 7/2015 | Varanasi | H03M 13/1128 |
| | | | 714/752 |
| 2018/0074957 A1* | 3/2018 | Cheng | G06F 12/0862 |
| 2018/0189135 A1* | 7/2018 | Naik | G11C 29/028 |
| 2019/0056981 A1* | 2/2019 | Shulkin | G06F 11/073 |
| 2020/0334085 A1* | 10/2020 | Qiu | G06F 9/5016 |
| 2022/0091953 A1* | 3/2022 | Asadi | G11C 16/3431 |
| 2022/0165337 A1* | 5/2022 | Bhatia | H03M 13/611 |
| 2022/0245028 A1* | 8/2022 | Okamoto | G11C 11/5642 |
| 2023/0153198 A1* | 5/2023 | Huang | G06F 3/0679 |
| | | | 714/723 |
| 2024/0161836 A1* | 5/2024 | Doru | G11C 11/5642 |

FOREIGN PATENT DOCUMENTS

| | | | | |
|---|---|---|---|---|
| CN | 113470723 B | | 7/2023 | |
| CN | 112802530 B | | 11/2023 | |
| WO | WO-2015147829 A1 | * | 10/2015 | ............ G06F 11/106 |

OTHER PUBLICATIONS

Kumari, P., et al., "Analytical Bit-Error Model of NAND Flash Memories for Dosimetry Application," *IEEE Transactions on Nuclear Science*, Mar. 2022, vol. 69(3), pp. 478-484, URL: https://doi.org/10.1109/TNS.2021.3125652.

Park, J., et al., "Reducing Solid-State Drive Read Latency by Optimizing Read-Retry," ASPLOS '21: Proc. of the 26$^{th}$ ACM International Conference on Architectural Support for Programming Languages and Operating Systems, Apr. 17, 2021, pp. 702-716, URL: https://doi.org/10.1145/3445814.3446719.

* cited by examiner

IN-MEMORY READ THRESHOLD ADAPTATION

BACKGROUND

Different types of flash memories may include single-level cell (SLC), multi-level cell (MLC), triple-level cell (TLC), quad-level cell (QLC), or other higher level cell flash memories. The SLC flash memory may store a single bit of data per memory cell, and the MLC, TLC, QLC, and higher-level flash memories may store multiple bits of data per memory cell. Each memory cell may store data as a voltage that correspond to a logical value represented by that memory cell. Each memory cell can be read by a memory controller using a set of read threshold voltages associated with the memory cell. However, noise, aging, and/or other factors can lead to data stored in the cell to be read incorrectly. As such, the firmware executing on the memory controller may adjust the read thresholds during the lifetime of the flash memory to minimize the bit errors.

BRIEF SUMMARY

Techniques to proactively adapt read thresholds internally in a memory device are described. By proactively adjusting the read thresholds internally in the memory device, a better quality-of-service (QOS) can be achieved because the likelihood that a read performed by the memory controller results in correct data on the first attempt can be increased. The memory device and the memory controller can be part of a storage device. Both the memory controller and the memory device can maintain a respective history read retry (HRR) table. According to some embodiments, for each entry of a set of entries of an in-memory HRR table, a test read of the memory device can be performed using a set of read thresholds corresponding to that entry. The entry having the lowest failed bit count (FBC) obtained from the test read of each entry can be identified. The in-memory HRR table can be updated to have the identified entry with the lowest FBC be placed at the beginning of the in-memory HRR table. The memory controller can then be notified to update an in-controller HRR table stored in the memory controller based on the update to the in-memory HRR table.

According to some embodiments, updating the in-memory HRR table may include moving an entry to the beginning of the in-memory HRR table in response to the test read of that entry having a lower FBC than the first entry of the in-memory HRR table when the test read is performed. The in-controller HRR table can be updated based on the update to the in-memory HRR table, and a subsequent read of the memory device by the memory controller can be performed using a set of read thresholds corresponding to the first entry of the updated in-controller HRR table. The subsequent read can be performed by providing an index stored in the first entry of the updated in-controller HRR table to the memory device to retrieve the set of read thresholds from a read thresholds table stored in the memory device. If the subsequent read operation contains uncorrectable errors, read retry attempts in order of entries of the updated in-controller HRR table can be performed, and the entries of the in-controller HRR table can be reordered.

According to some embodiments, a storage device may include a memory device and a memory controller coupled to the memory device. The memory controller may include an in-controller HRR table, and the memory device may include an in-memory HRR table. The memory device is operable to perform, for each entry of a set of entries of the in-memory HRR table, a test read of the memory device using a set of read thresholds corresponding to that entry, and identify the entry having the lowest FBC obtained from the test read of each entry. The memory device may further include an in-memory decoder to determine the FBC of the test read. The memory device is further operable to update the in-memory HRR table to have the identified entry with the lowest FBC be placed at the beginning of the in-memory HRR table, and notify the memory controller to update the in-controller HRR table based on the update to the in-memory HRR table.

According to some embodiments, the memory controller is operable to update the in-controller HRR table based on the update to the in-memory HRR table, and perform a subsequent read of the memory device using a set of read thresholds corresponding to the first entry of the updated in-controller HRR table. The memory controller is further operable to perform the subsequent read by providing the index stored in the first entry of the updated in-controller HRR table to the memory device to retrieve the set of read thresholds from a read thresholds table stored in the memory device. If the subsequent read operation contains uncorrectable errors, the memory controller is operable to perform read retry attempts in the order of the entries of the in-controller HRR table, and reorder the entries of the in-controller HRR table.

BRIEF DESCRIPTION OF THE DRAWINGS

Various embodiments in accordance with the present disclosure will be described with reference to the drawings, in which.

DETAILED DESCRIPTION

Figure 1:
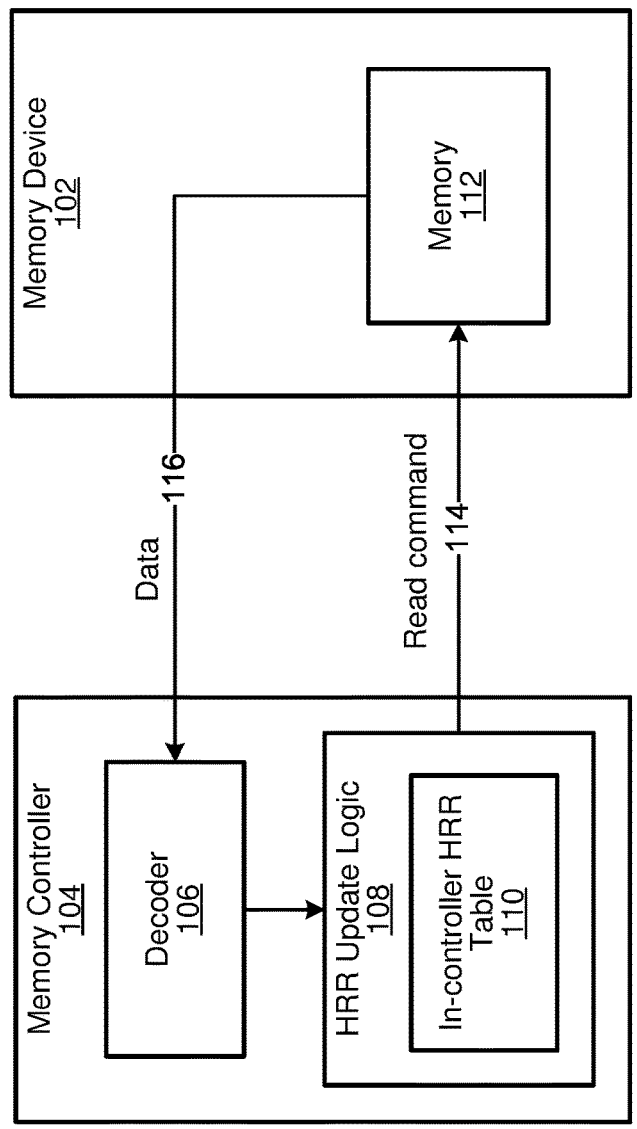
FIG. 1 illustrates an example high level block diagram of a storage device that can support read retry mechanism for read operations.

Data storage devices such as solid-state storage devices implemented using flash memories (e.g., NAND flash) may support read retry mechanism to adjust read threshold voltages. Generally, a memory controller of the storage device may maintain a history read retry (HRR) table with entries that each correspond to a respective set of read thresholds. The number of read threshold values provided in each entry can be based on the type of flash memory. For example, a TLC flash memory storing 3 bits of data per memory cell may support 8 charge states, and therefore each set of read thresholds may include 7 read threshold values to define the 8 charge states. As another example, QLC flash memory storing 4 bits of data per memory cell may support 16 charge states, and therefore each set of read thresholds may include 15 read threshold values to define the 16 charge states.

The memory controller may read data from the memory according to specific read thresholds. However, noise, aging, and/or other factors can cause bit errors on the memory reads. Memories supporting higher number of bits per cell are more susceptible to bit errors, because increasing the number of bits stored per cell shrinks the voltage margins defining the different charge states. To mitigate against the bit errors, firmware executing on the memory controller may adjust the read thresholds. The memory controller may perform multiple read retry attempts using different sets of read thresholds from an in-controller HRR table until the data can be read successfully. As an example, the memory controller may send a first read command to the memory device using a first set of read thresholds based on the top or starting entry of the in-controller HRR table. If the data read from the memory using the first set of read thresholds is decoded successfully, the read operation can be completed, and the HRR table is not updated. However, if the first read attempt is not successful (e.g., contains bit errors or uncorrectable errors), the memory controller may continue reading the memory location using the next set of read thresholds based on the next entry from the HRR table. The memory controller may continue traversing down the entries of the HRR table for each read retry attempt until the data can be read successfully. The memory controller may update the HRR table to place the entry corresponding to the set of read thresholds that resulted in a successful read operation to the top or beginning of the HRR table, such that the entry resulting in the successful read can be used as the first read attempt in a subsequent read operation.

Thus, the read thresholds adaptation is generally performed reactively by the memory controller upon a read failure. However, updating the in-controller HRR table in response to the read failure by the memory controller may trigger multiple read retries, which can impact Quality-of-Service (QOS) of the storage device. The QoS of the storage device is generally based on the consistency and predictability of latency (response time) and input/output operations per second (IOPS) performance when servicing a read/write workload. Thus, it is desirable for the first read attempt from the memory controller to be successful so that the read retries can be avoided to maintain a high QoS. Some implementations may employ a proactive HRR adaptation by the memory controller instead of a reactive HRR adaptation. However, proactive HRR adaptation performed by the memory controller involving test reads may require a large amount of data transfer between the memory controller and the memory device, which can cause drop in performance, and may consume excessive power.

The techniques described herein can be used to proactively adapt read thresholds internally inside the memory device without incurring data transfers between the memory controller and the memory device, and can improve the likelihood of a successful read on the first attempt by the memory controller. Thus, the QoS of the storage device can be improved significantly as compared to the techniques that utilize reactive updates of the read thresholds. The proactive adaptation of the read thresholds can be performed by maintaining an in-memory HRR table in the memory device that includes a set of entries similar to the in-controller HRR table. Hence, both the memory controller and the memory device of the storage device have a copy of the HRR table. Each entry in the set of entries of each HRR table may store an index that maps to a set of read thresholds in a read thresholds table stored in the memory device. The order of the entries in the in-controller HRR table reflects the order of the sets of read thresholds that the memory controller will use when attempting to read the memory device. It should be noted that the memory device can be organized into partitions, sectors, blocks, or other granularities, and each granularity may have its own corresponding HRR table. Hence, different memory locations can be read using different sets of read thresholds based on their respective HRR tables.

To perform the in-memory proactive read threshold adaptation, the memory device may conduct a test read of the memory for each entry of the in-memory HRR table using a corresponding set of read thresholds based on the index of that entry. The test reads may be performed in the background when the memory device is not processing any commands from the memory controller. The test read data can be provided to an in-memory decoder, which can decode the test read data and report a failed bit count (FBC). The FBC may represent the number of flipped bits in the decoded test read data. The memory device may identify an entry in the set of entries of the in-memory HRR table that has the lowest FBC determined by the in-memory decoder. The memory device may update the in-memory HRR table by having the identified entry with the lowest FBC be placed as the first entry at the beginning or start of the HRR table, and the remaining entries in the order of increasing FBC.

The memory device may also notify the memory controller to update the in-controller HRR table based on the update made to the in-memory HRR table so that each entry in the in-controller HRR table reflects the in-memory HRR table for the subsequent read operations. For example, the memory controller may perform a subsequent read of the memory using a set of read thresholds corresponding to the first entry of the updated in-controller HRR table that represents the identified entry of the in-memory HRR table with the lowest FBC. The memory controller may provide the index stored in the first entry of the updated in-controller HRR table to the memory device as part of the read command, which can be used by the memory device to retrieve the corresponding set of read thresholds from the read thresholds table to read the memory. The memory device may notify the memory controller of updates to the in-memory HRR table whenever the in-memory HRR table is updated, or at a periodic interval based on a predetermined time duration or a predetermined number of memory accesses.

In some examples, the subsequent read operation performed by the memory controller may contain uncorrectable errors. In such cases, the memory controller may perform read retry attempts in the order of the entries of the updated in-controller HRR table. The memory controller may reorder the entries in the updated in-controller HRR table by sending multiple read commands to the memory device using corresponding set of read thresholds until the read operation is successful. Consequently, the memory controller may update the in-controller HRR table to place the entry resulting in the successful read as the first entry for future read operations.

In some implementations, the memory device may include a plurality of memory dies, each memory die may include a plurality of memory blocks, and each memory block may include a plurality of pages. In some embodiments, each memory block may include a corresponding in-memory HRR table. In other embodiments, each die may include a corresponding in-memory HRR table that may be shared by the plurality of memory blocks in that die. In various embodiments, one or more in-memory decoders may be shared by the memory device for each of the dies. However, other implementations based on other granularities are also possible.

Thus, various embodiments can support proactive HRR adaptation to update an in-memory HRR table in the memory device by performing background test reads. The in-controller HRR table can be updated using a small amount of data transfer from the memory device indicating the updated order of the HRR entries, and the updated in-controller HRR table can be used for subsequent read operations that can minimize first read failures. Thus, a high QoS of the memory device can be maintained without impacting the performance of the storage device. In the event that the memory controller encounters a first read failure using the updated in-controller HRR table, the firmware executing on the memory controller can perform reactive updates to the in-controller HRR table by reordering the entries of the in-controller HRR table.

FIG. 1 illustrates a high-level block diagram of an example of a storage device 100 that can support read retry mechanism for read operations. The example storage device 100 may include a memory device 102 and a memory controller 104. The memory controller 104 may include a decoder 106 and history read retry (HRR) update logic 108. The HRR update logic 108 may include an in-controller HRR table 110 comprising a set of entries. The memory controller 104 may include one or more processors that can be configured to execute instructions stored in a computer readable storage medium. For example, the memory controller 104 may execute firmware operable to manage read/write accesses to the memory device 102, and communicate with a host device, among other tasks.

The memory device 102 may include a memory 112 comprising one or more memory dies. Each memory die may include a plurality of memory blocks, and each memory block may include multiple memory pages. As an example, the memory device 102 may include NAND flash memory comprising one or more flash chips or dies. Some examples of the NAND flash memory may include SLC flash memory, MLC flash memory, TLC flash memory, or QLC flash memory, etc. The NAND flash memory may store data in the form of a threshold voltage of each flash cell, which may represent voltage at which the flash cell can be switched on. The threshold voltage of the cell may be distributed among different states, and each state may correspond to a certain threshold voltage window within the span of the overall threshold voltage of the cell. For example, SLCs may store a 1-bit value, and encode the 1-bit to one of the two threshold voltage states based on the cell charge being above or below the threshold voltage. MLCs may store a 2-bit value in each cell with four possible threshold voltage states; TLCs may store a 3-bit value in each cell with eight possible threshold voltage states; and QLCs may store a 4-bit value in each cell with sixteen possible threshold voltage states.

A read threshold voltage may represent a boundary between neighboring threshold voltage windows in the cell, and can be used to identify the state of the cell when a read operation of the cell is performed. In some examples, the read threshold voltage is also referred to as a read reference voltage. For examples, an SLC can be read by applying a single read threshold voltage to distinguish between the two states of the SLC. Similarly, a MLC can be read by applying three read threshold voltages to distinguish between four threshold voltage states, a TLC can be read by applying seven read threshold voltages to distinguish between eight threshold voltage states, and a QLC can be read by applying fifteen read threshold voltages to distinguish between sixteen threshold voltage states.

However, distribution of threshold voltages may shift over time in the cell, which can cause the threshold voltage windows assigned to different states to shift, resulting in errors in the read data. Noise or coupling effects from nearby cells can also attribute to errors in the read data. Some flash memories may support a read-retry mechanism that can adjust the read threshold voltages to compensate for the noise or shift in the threshold voltage distribution. In some implementations, the set of entries of the in-controller HRR table 110 may include N number of entries that each corresponds to a set of read thresholds to be used for a corresponding read retry attempt until the read operation succeeds. The memory controller 104 may send a read command 114 to perform the first read operation using the default read threshold voltages (e.g., corresponding to the first entry in the in-controller HRR table 110). If the first read operation is not successful, the memory controller 104 may send additional read commands 114 to retry the read operations using successive sets of read thresholds until a read operation succeeds.

Referring to FIG. 1, the decoder 106 may be operable to perform error correction decoding on data 116 read from the memory device 102 for each read operation and provide a decoder status to the HRR update logic 108 based on whether the decoder 106 was able to successfully correct the errors on the data. In some implementations, the error correction decoding is implemented using Low-Density Parity Check (LDPC) codes, and the decoder 106 may include multiple decoders that employ different decoding algorithms (e.g., bit-flipping, min-sum, etc.). The decoder status may include a "pass" status indicating that the decoding was successful (e.g., the error has been corrected), or a "fail" status indicating that the decoding was not successful (e.g., the data 116 includes uncorrectable errors).

Figure 2:
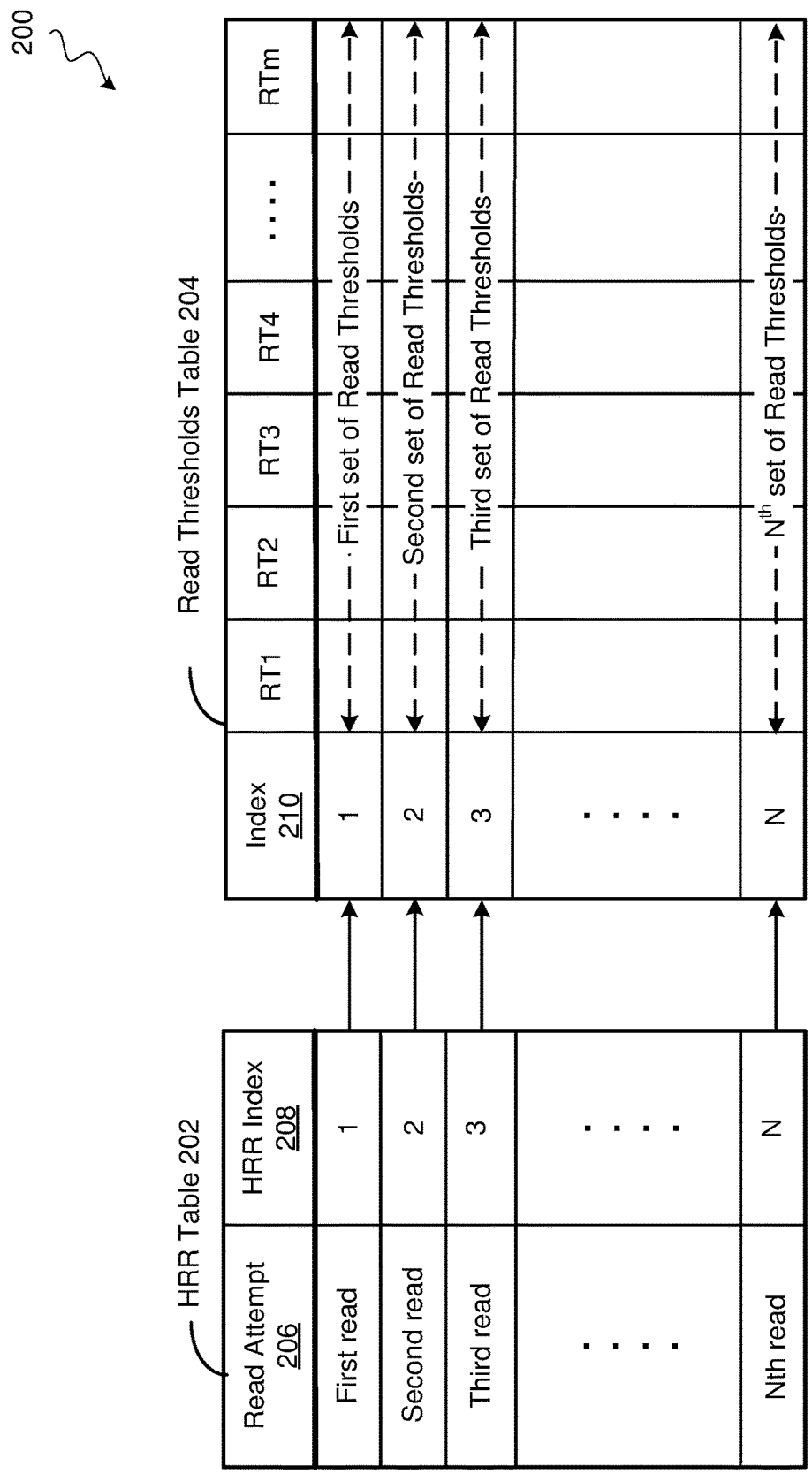
FIG. 2 illustrates an example diagram of an history read retry (HRR) table comprising N number of entries that each corresponds to a default set of read thresholds in a read thresholds table.

FIG. 2 illustrates an example diagram 200 of an HRR table 202 comprising N number of entries that each corresponds to a default set of read thresholds in a read thresholds table 204.

In some examples, the HRR table 202 can be the in-controller HRR table 110. The read thresholds table 204 may be stored in the memory controller 104, or in the memory device 102 based upon the implementation.

Each of the N entries in the HRR table 202 may include an HRR index 208 for each read attempt 206 that can be made by the memory controller 104 to read the memory device 102. The HRR index 208 may include an index value that points to an entry (e.g., referenced by index 210) in the read thresholds table 204 corresponding to a set of read thresholds. The read thresholds table 204 may include a first set of read thresholds corresponding to an index value of 1, a second set of read thresholds corresponding to an index value of 2, a third set of read thresholds corresponding to an index value of 3, and up to an $N^{th}$ set of read thresholds corresponding to an index value of N. Each set of read thresholds may include M number of read threshold values representing threshold voltages RT1, RT2, RT3, RT4, and RTm. As described previously, the value of M can be 7 for the TLCs (e.g., 7 read thresholds), 15 for the QLCs (e.g., 15 read thresholds), etc.

The example HRR table 202 in FIG. 2 is shown with a default order for the read attempts. For example, a first entry of the HRR table 202 corresponds to the first set of read thresholds based on the HRR index 208 being 1 for the first read attempt 206, a second entry of the HRR table 202 corresponds to the second set of read thresholds based on the HRR index 208 being 2 for the second read attempt 206, a third entry of the HRR table 202 corresponds to the third set of read thresholds based on the HRR index 208 being 3 for the third read attempt 206, and an $N^{th}$ entry of the HRR table 202 corresponds to the $N^{th}$ set of read thresholds based on the HRR index 208 being N for the $N^{th}$ read attempt 206. The number of entries in HRR table can be any suitable number, and in some implementations can be based on the allowable number of read retry attempts according to a latency specification of the storage device.

Referring back to FIG. 1, the memory controller 104 may support read retry mechanism by performing read retry attempts in the order of entries of the in-controller HRR table 110. The memory controller 104 may perform each read attempt to read the memory device 102 with a set of read threshold voltages corresponding to the HRR index 208 in the order of entries of the in-controller HRR table 110 until the data 116 is read successfully from the memory device 102.

For example, the memory controller 104 may send the read command 114 to the memory device 102 to read a memory page using the first set of read thresholds corresponding to the value 1 for the HRR index 208. If the first read attempt is unsuccessful, the memory controller 104 may attempt a second read of the memory page using the second set of read thresholds corresponding to the value 2 for the HRR index 208. If the second read attempt is also unsuccessful, the memory controller 104 may attempt a third read of the memory page using the third set of read thresholds corresponding to the value 3 for the HRR index 208, and so on. In some implementations, if none of the entries result in a successful read (e.g., a read that contains no errors or only correctable errors), a new set of read thresholds can be determined by adjusting the read threshold voltages, for example, based on log-likelihood ratios (LLRs).

When a set of read thresholds used for a read attempt results in a successful read, the memory controller 104 may update the in-controller HRR table 110 to place the entry corresponding to the set of read thresholds that resulted in the successful read operation at the beginning of the in-controller HRR table 110 so that a subsequent read operation uses that set of read thresholds for a first read attempt. Thus, the update to the in-controller HRR table 110 is performed reactively in response to a read failure. This is further described with reference to FIG. 3.

Figure 3:
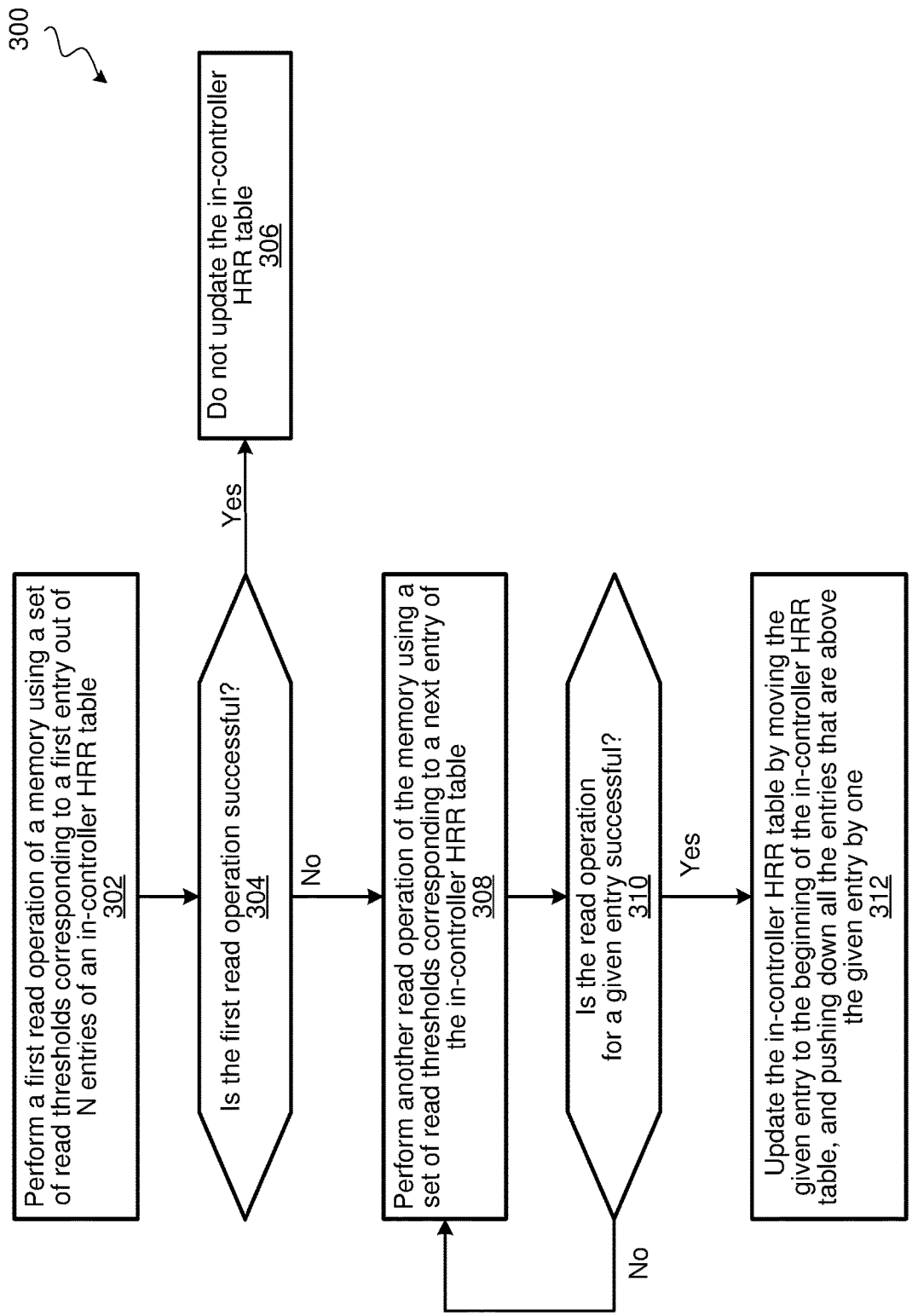
FIG. 3 illustrates a flow diagram of an example of a process performed by a memory controller for a reactive HRR table adaptation in some embodiments.

FIG. 3 illustrates a flow diagram of an example of a process 300 performed by the memory controller 104 for a reactive HRR table adaptation. In some implementations, the process 300 may be implemented using hardware circuitry in the memory controller 104, software code (e.g., firmware, etc.) executed by a processor of the memory controller 104, or a combination of both.

Process 300 may begin at block 302 by performing a first read operation of a memory using a set of read thresholds corresponding to a first entry out of N entries of an in-controller HRR table. As an example, the in-controller HRR table can be the in-controller HRR table 110 in FIG. 1. Referring back to FIG. 2, the memory controller 104 may perform a first read operation of the memory 112 using the first set of read thresholds corresponding to the HRR index 208 of 1 for the first entry of the HRR table 202. In some implementations, the read command 114 may include the HRR index 208 having the value 1 that points to the value 1 of the index 210, which can be used to retrieve the first set of read thresholds from the read thresholds table 204.

At block 304, the memory controller 104 may determine whether the first read operation is successful. For example, the HRR update logic 108 may determine whether the first read operation is successful based on the decoder status provided by the decoder 106 from decoding the data 116 read from the memory device 102. At block 306, if the first read operation is successful, the first read operation may be considered complete, and the in-controller HRR table 110 is not updated.

At block 308, the memory controller 104 may determine that the first read operation is not successful based on the decoder status provided by the decoder 106. The memory controller 104 may identify an $i^{th}$ entry from the entries 2, 3, . . . . N entries of the HRR table 202 that results in a successful read operation. As shown in FIG. 3, the memory controller 104 may perform another read operation of the memory using a set of read thresholds corresponding to the next entry of the in-controller HRR table 110. For example, the memory controller 104 may send the read command 114 to the memory device 102 including the HRR index 208 having a value 2 to use the second set of read thresholds corresponding to the second entry of the in-controller HRR table 110.

At block 310, the memory controller 104 may determine whether the read operation for a given entry is successful. For example, the HRR update logic 108 may determine whether the second read operation is successful based on the decoder status provided by the decoder 106 from decoding the data 116 read from the memory device 102. If the decoder status indicates an unsuccessful read operation (e.g., the data 116 contains uncorrectable errors), the memory controller 104 may continue performing the read operations for each remaining entry of the in-controller HRR table 110. For example, the memory controller 104 may send another read command 114 to the memory device 102 including the HRR index 208 having a value 3 to use the third set of read thresholds corresponding to the third entry of the in-controller HRR table 110, and determine whether the read operation using the third set of read thresholds is successful. Thus, the steps 308 and 310 may be repeated for each entry of the in-controller HRR table 110 starting with the second entry until the decoder status indicates that the read operation is successful for a given entry.

At block 312, the memory controller 104 may update the in-controller HRR table 110 by moving the entry that resulted in a successful read operation to be at the beginning of the in-controller HRR table 110. In some implementations, moving an entry to be at the beginning of the in-controller HRR table 110 may include pushing down all the entries that are above that entry in the in-controller HRR table 110 by one. As an example, the memory controller 104 may determine that the third entry resulted in the successful read operation. Thus, the memory controller 104 may update the in-controller HRR table 110 by moving the third entry to be at the beginning of the in-controller HRR table 110, and pushing down the first and the second entries by one in the in-controller HRR table 110. As used herein, moving or pushing an entry in the HRR table may refer to updating the value of the HRR index for that entry in the HRR table. Thus, moving the third entry to be at the beginning of the in-controller HRR table 110, and pushing down the first and the second entries by one in the in-controller HRR table 110 may refer to updating the value of the HRR index 208 for the first entry to be 3, the value of the HRR index 208 for the third entry to be 2, and the value of the HRR index 208 for the second entry to be 1.

Figure 4:
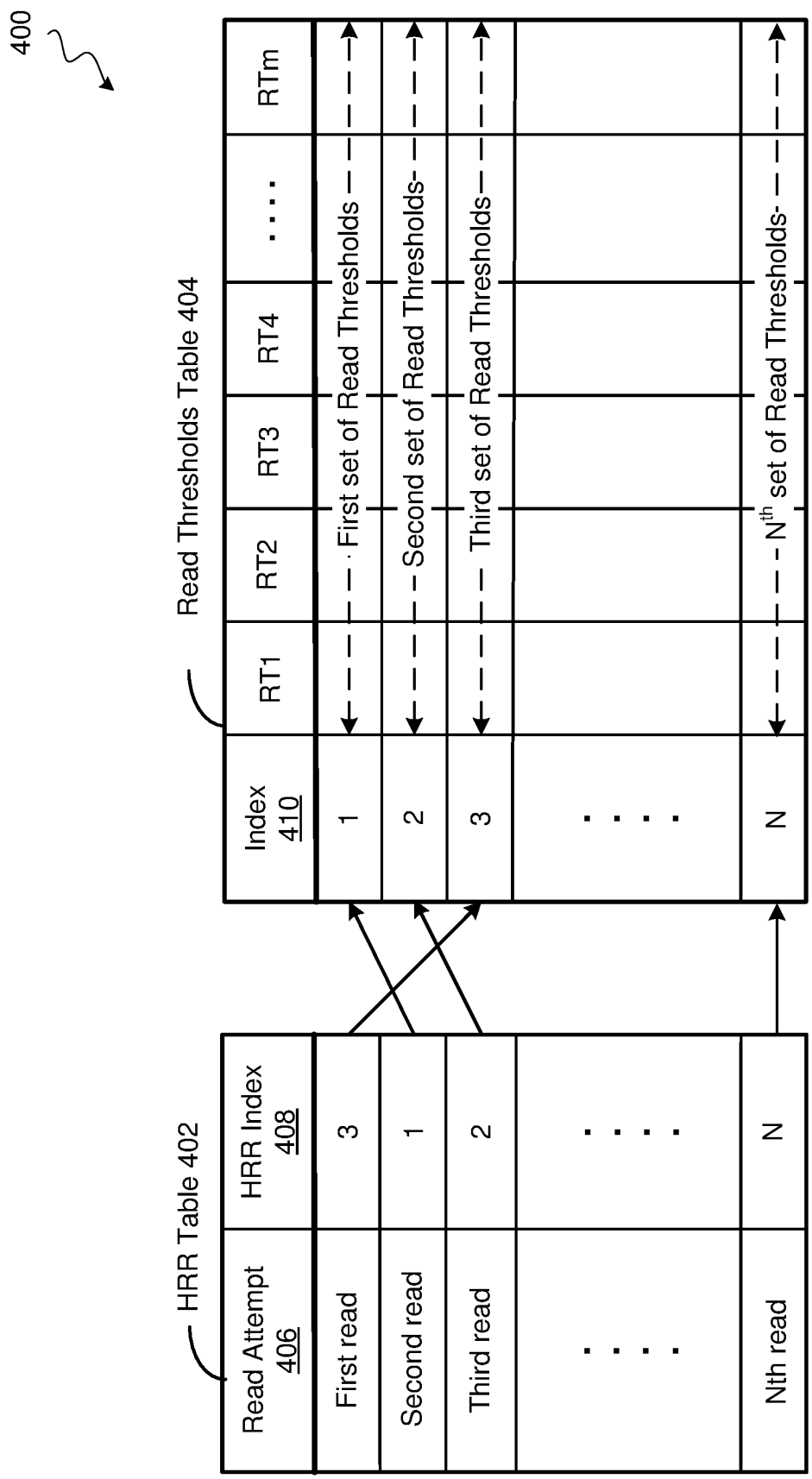
FIG. 4 illustrates an example diagram of an HRR table that has been updated using the reactive HRR table adaptation described with reference to FIG. 3.

FIG. 4 illustrates an example diagram 400 of an HRR table that has been updated using the reactive HRR table adaptation described with reference to FIG. 3. An HRR table 402 shown in FIG. 4 may be an example of the in-controller HRR table 110 or the HRR table 202 that has been updated based on the process 300 described with reference to FIG. 3. The HRR table 402 may include an HRR index 408 for each read attempt 406 that points to an index 410 in a read thresholds table 404. The read thresholds table 404 may be an example of the read thresholds table 204 in FIG. 2, and may include N sets of read thresholds, with each set of read thresholds comprising M number of read thresholds.

As shown in FIG. 4, the updated HRR table 402 includes the HRR index 408 having a value 3 for the first entry indicating that the first read attempt should use the third set of read thresholds, a value 1 for the second entry indicating that the second read attempt should use the first set of read thresholds, a value 2 for the third entry indicating that the third read attempt should use the second set of read thresholds. The rest of the entries in the updated HRR table 402 may remain unchanged. Thus, as described with reference to the block 312 for the process 300, the third entry in the HRR table 202 that resulted in a successful read operation has been moved to be at the beginning of the updated HRR table 402 as the first entry. As described previously, the memory controller 104 may use the third set of read thresholds for the subsequent read operations of the memory device 102 based on the updated HRR table 402.

The reactive update of the in-controller HRR table 110 described above is performed upon a read failure of the memory device 102. The read retry attempts performed by the memory controller 104 may involve sending multiple read commands 114 to the memory device 102 until a read success is achieved. However, these read retry attempts performed by the memory controller 104 may significantly increase the overall read operation latency, and impact the QoS of the NAND flash memory. Thus, it is desirable to improve the likelihood that a successful read of the memory device 102 is achieved on the first read attempt so that the number of read retry attempts performed by the memory controller 104 can be minimized. In some implementations, the memory controller 104 may update the in-controller HRR table 110 proactively instead of reactively. This can be done, for example, by having the memory controller issue test reads (e.g., reads that are not initiated by a host device) to the memory device. However, this proactive update of the in-controller HRR table 110 may require transferring large amounts of data being read from the memory device 102 to the memory controller 104, which may consume unnecessary power and memory bandwidth, and impact the performance of the storage device.

The techniques described herein can be used to improve the likelihood of success on the first reads of a memory device by maintaining an HRR table in the memory device, which can be updated proactively by the memory device with internal test reads of the memory. This is further described with reference to FIG. 5.

Figure 5:
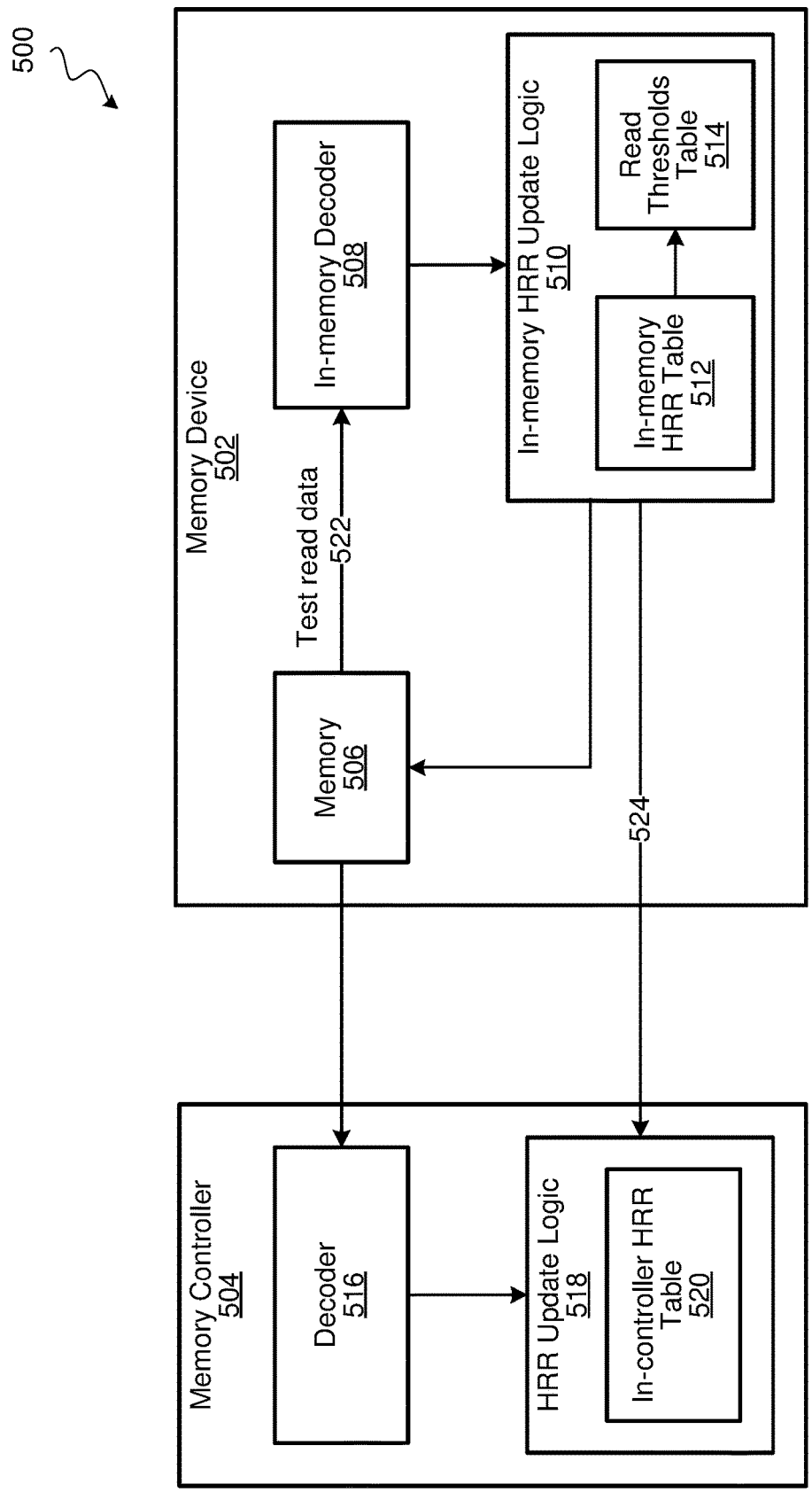
FIG. 5 illustrates an example diagram of a storage device comprising a memory device coupled to a memory controller that can support in-memory read threshold adaptation, in accordance with some embodiments.

FIG. 5 illustrates an example block diagram of a storage device 500 comprising a memory device 502 coupled to a memory controller 504 that can support in-memory read threshold adaptation, in accordance with some embodiments. The memory device 502 may include a plurality of memory dies, each memory die may include a plurality of memory blocks, and each memory block may include a plurality of memory pages. As an example, the memory device 502 may include a NAND flash memory comprising one or more flash chips or dies.

The memory controller 504 may include a decoder 516 and an HRR update logic 518. The decoder 516 in memory controller 504 may be similar to the decoder 106, and may perform error correction decoding on the data read from the memory device 502 and provide a status to the HRR update logic 518 based on whether the decoder 516 was able to successfully correct the errors on the data or the data contains uncorrectable errors. The HRR update logic 518 may include an in-controller HRR table 520, which may be similar to the in-controller HRR table 110, and comprise N number of entries.

The memory device 504 may include a memory 506 coupled to an in-memory decoder 508 and an in-memory HRR update logic 510. The in-memory HRR update logic 510 may include an in-memory HRR table 512 and a read thresholds table 514. In some embodiments, the memory 506 may include one or more memory dies each comprising a plurality of memory blocks, and each of the plurality of memory blocks on the same memory die may share the same in-memory decoder 508 and the in-memory HRR updated logic 510. In other embodiments, the memory 506 may include a memory block, and the memory device 502 may include a separate in-memory decoder 508 and an in-memory HRR updated logic 510 for each of the memory blocks in the plurality of memory blocks in the memory device 502.

The in-memory HRR table 512 may be similar to the HRR table 202, and comprise N number of entries. The read thresholds table 514 may be similar to the read thresholds table 204, and comprise N sets of read thresholds, and each set of read thresholds may include M number of read thresholds. The in-controller HRR table 520 and the in-memory HRR table 512 may include with a default order, as shown for the HRR table 202 in FIG. 2. For example, a first entry in the in-controller HRR table 520 and in the in-memory HRR table 512 may correspond to a first set of read thresholds in the read thresholds table 514, a second entry in the in-controller HRR table 520 and in the in-memory HRR table 512 may correspond to a second set of read thresholds in the read thresholds table 514, a third entry in the in-controller HRR table 520 and in the in-memory HRR table 512 may correspond to a third set of read thresholds in the read thresholds table 514, an $N^{th}$ entry in the in-controller HRR table 520 and in the in-memory HRR table 512 may correspond to an $N^{th}$ set of read thresholds in the read thresholds table 514, and so on.

The in-memory HRR update logic 510 may be operable to perform a test read of the memory 506 (e.g., a memory page) for each entry of the N entries of the in-memory HRR table 512 using a corresponding set of read thresholds from the read thresholds table 514. The in-memory HRR update logic 510 may be operable to perform the test reads as a background process when no command is being processed or received from the memory controller 504. The in-memory decoder 508 may be operable to decode test read data 522 from the test read of the memory 506 and provide a failed-bit count to the in-memory update logic 510. In some embodiments, the in-memory decoder 508 may be an error correction code (ECC) decoder operable to decode a noisy codeword and generate the FBC. In some implementations, the codeword can be implemented using low-density parity code (LDPC). The FBC may represent the number of flipped bits in the noisy codeword from the decoded codeword. The in-memory decoder 508 can be a lighter-weight decoder as compared to the memory controller decoder 516, and may support the minimum functionality needed to compute the FBC. For example, the in-memory decoder 508 can have a lower error correction capability and/or fewer circuitry than decoder 516.

The in-memory HRR update logic 510 may be further operable to identify an entry in the N entries of the in-memory HRR table 512 that has a lowest FBC compared to other entries. The in-memory HRR update logic 510 may be further operable to update the in-memory HRR table 512 to have the identified entry with the lowest FBC to be placed at the beginning of the in-memory HRR table 512. This is further described with reference to a process in FIG. 6.

Figure 6:
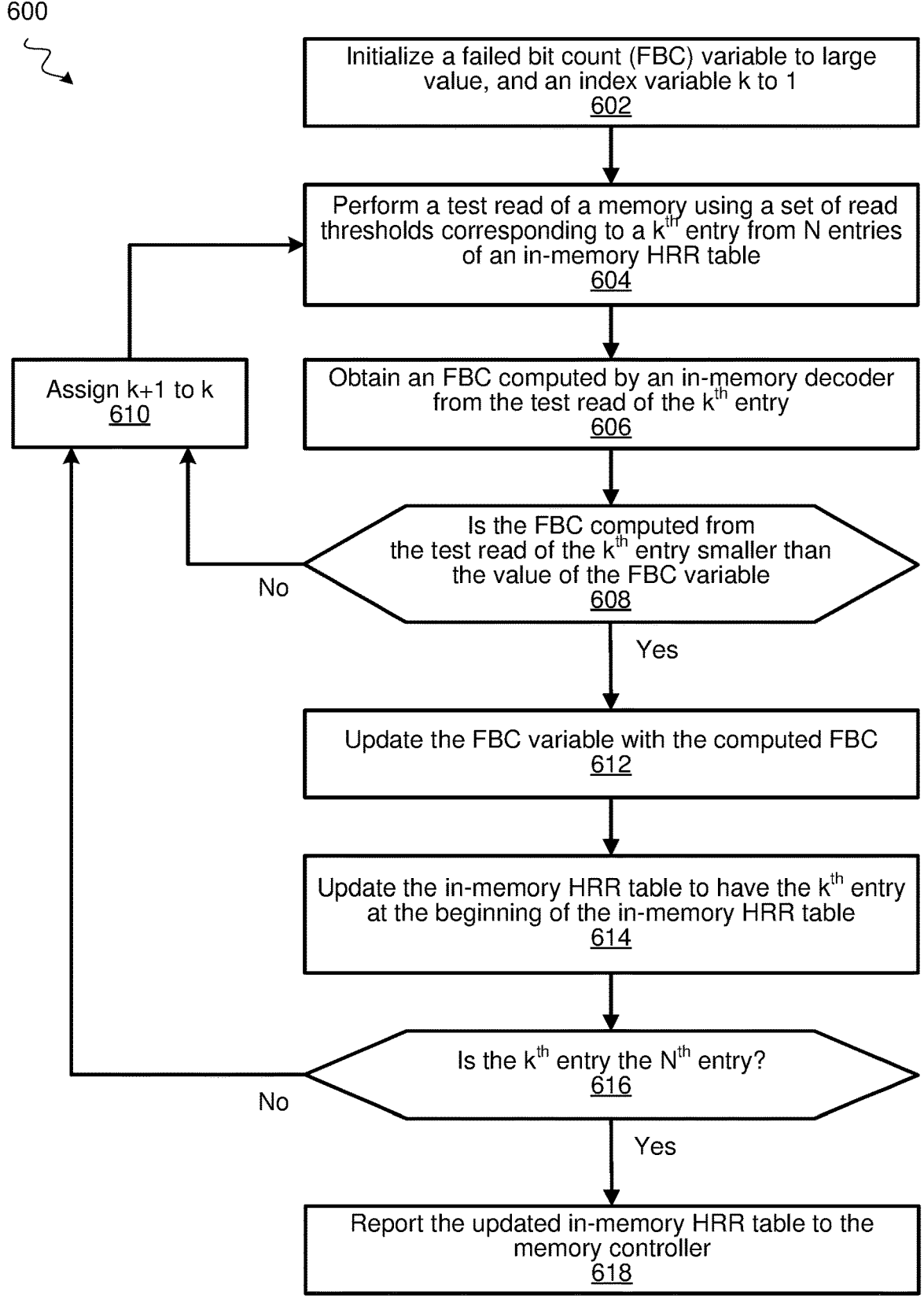
FIG. 6 illustrates an example flow chart for a process that can be implemented by a memory device to perform the in-memory read threshold adaptation, in accordance with some embodiments.

FIG. 6 illustrates an example flow chart for a process 600 that can be implemented by a memory device to perform the in-memory read threshold adaptation, in accordance with some embodiments. As an example, the process 600 can be implemented by the memory device 502 of the storage device 500.

At block 602, the process 600 may start by initializing an FBC variable to a very large value, and an index variable k to 1. As an example, the FBC variable may be initialized to a very large value (e.g., 10,000) so that the initialized value of the FBC variable is always greater than a maximum possible FBC for any of the decoded codewords read from the memory device 502. The index variable k may represent an entry of the in-memory HRR table 512. For example, initializing the index variable k to 1 may represent the first entry of the in-memory HRR table 512.

At block 604, the memory device 502 may perform a test read of a memory using a set of read thresholds corresponding to a $k^{th}$ entry from the N entries of an in-memory HRR table. For example, with k being 1, the in-memory HRR update logic 510 may perform a test read of the memory 510 using a first set of read thresholds corresponding to a first entry from the N entries of the in-memory HRR table 512. At block 606, the memory device 502 may obtain an FBC computed by an in-memory decoder from the test read of the $k^{th}$ entry. For example, the in-memory HRR update logic 510 may obtain an FBC computed by the in-memory decoder 508 from the test read data 522 received from the test read of the first entry.

At block 608, the memory device may determine whether the FBC computed from the test read of the $k^{th}$ entry is smaller than the value of the FBC variable. For example, the in-memory HRR update logic 510 may determine whether the FBC computed from the test read of the first entry is smaller than the value of the FBC variable. If the FBC computed from the test read of the first entry is larger than the value of the FBC variable, the process 600 may continue to block 610 to perform another test read of the memory 510. If the FBC computed from the test read of the first entry is smaller than the value of the FBC variable, then process 600 may continue to block 612 to update the FBC variable with the computed FBC. Thus, the FBC variable is updated with the value of the lower FBC computed from the test read of the first entry.

At block 614, memory device may update the in-memory HRR table to have the kth entry be at the beginning of the in-memory HRR table. In some implementations, updating the in-memory HRR table may include moving the $k^{th}$ entry to the beginning of the in-memory HRR table 512 and pushing down all the entries that are above the $k^{th}$ entry in the in-memory HRR table 512 by one. Since the $k^{th}$ entry is the first entry, update to the in-memory HRR table 512 does not change the contents of the in-memory HRR table 512. At block 614, the memory device may determine whether the $k^{th}$ entry is the $N^{th}$ entry (e.g., the last entry). Since the first entry is not the $N^{th}$ entry, the process 600 may continue to block 610. At block 610, the index variable k is incremented by 1, and the process 600 goes back to block 604.

Next, the blocks 604-616 may be executed again for each value of k representing the next entry of the in-memory HRR table 512 until the value of k equals to the last entry. For example, when k is incremented to 2, the FBC computed from the test read of the second entry may be compared in block 608 with the FBC variable that has the FBC computed from the test read of the first entry. If the FBC computed from the test read of the second entry is smaller than the FBC computed from the test read of the first entry, the FBC variable may be updated with the computed FBC for the second entry in block 612. The in-memory HRR update logic 510 in the memory device 502 may update the in-memory HRR table 512 to have the second entry be at the beginning of the in-memory HRR table 512. Thus, by repeating blocks 604-616 for each entry of the in-memory HRR table 512, the in-memory HRR table 512 can be updated to reorder the entries in the order of increasing FBC starting with the first entry of the in-memory HRR table 512 based on the FBC computed for each entry from performing the test reads of the memory 510 for each entry.

At block 618, the in-memory HRR update logic 510 may report the updated in-memory HRR table 512 to the memory controller 504. In some embodiments, reporting the updated in-memory HRR table 512 may include sending the order of the HRR indices of the in-memory HRR table 512 to the memory controller 504. Subsequently, the memory controller 504 can update its own in-controller HRR table 520 to reflect the updated order of indices, which can be used to retrieve the corresponding set of read thresholds for the subsequent read operations. Process 600 can be performed periodically, for example, based on a predetermined time interval or after every predetermined number of memory accesses from the memory controller to refresh the order of the HRR entries. An example of an updated in-memory HRR table 512 is shown in FIG. 7.

Figure 7:
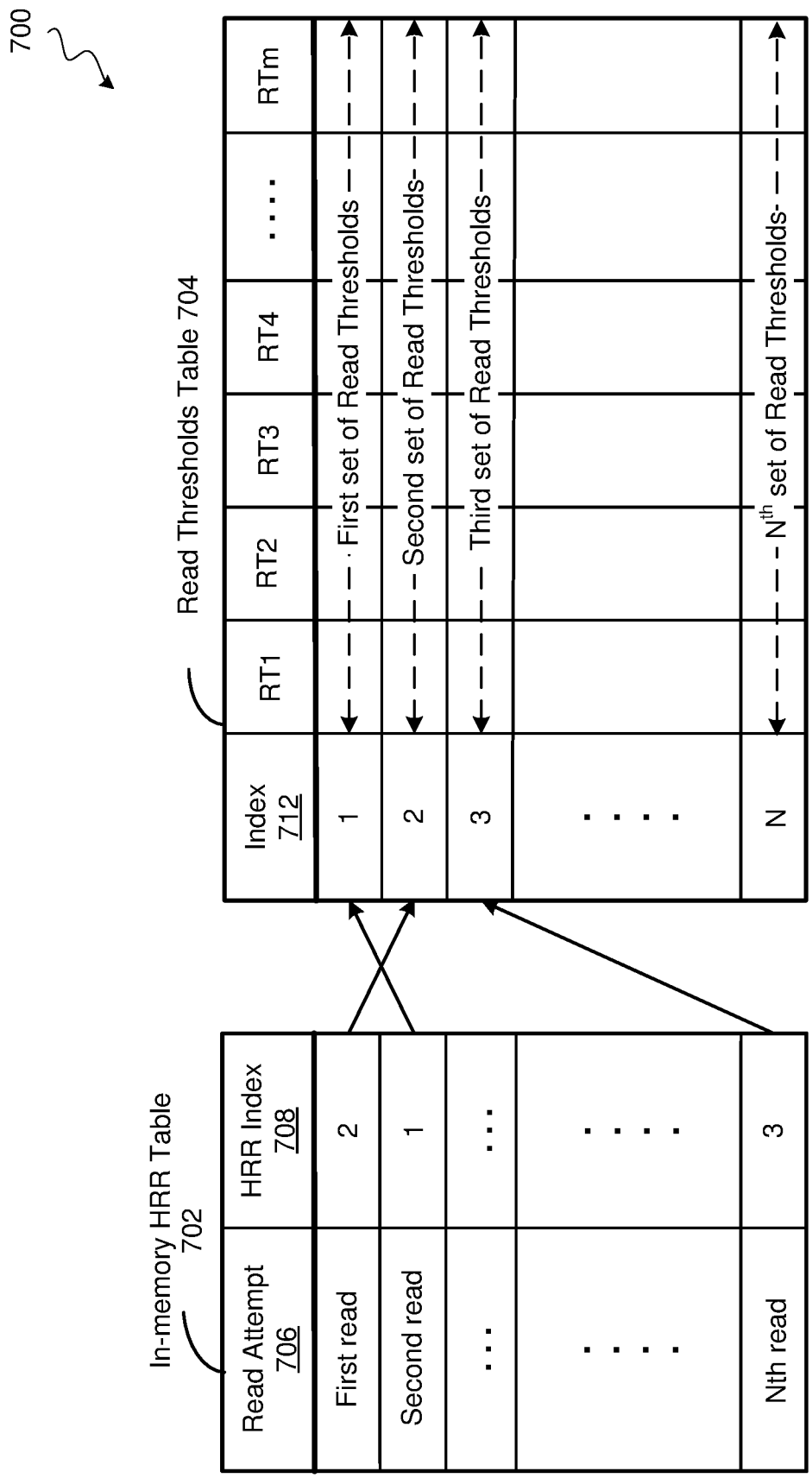
FIG. 7 shows an in-memory HRR table and a read thresholds table for a memory device, in some embodiments.

FIG. 7 shows an in-memory HRR table 702, and a read thresholds table 704 for a memory device, in some embodiments. The in-memory HRR table 702 may be an example of the HRR table 512, and the read thresholds table 704 may be an example of the read thresholds table 514 for the memory device 502.

Prior to being updated, the in-memory HRR table 702 and the read thresholds table 704 may include the default values similar to the HRR table 202 and the read thresholds table 204 at the start of the process 600. The in-memory HRR table 702 may be updated in block 614 if the FBC computed for a $k^{th}$ entry is smaller than the FBC for the first entry. As shown in FIG. 7, the in-memory HRR table 702 may be updated to have the second entry at the beginning of the in-memory HRR table 702 by updating the HRR index 708 with a value 2 upon determining that the FBC computed from the test read of the second entry is smaller than the FBC computed from the test read of the first entry. As described previously, updating the in-memory HRR table 702 may also include pushing down the entry above the $k^{th}$ entry by one. Thus, the first entry can be pushed down to the second entry by updating the HRR index 708 for the second entry with the value 1. According to some embodiments, the in-memory HRR table 702 may include the updated values of the HRR index 708 for each entry in the increasing order of the FBC starting with the first entry. Thus, as shown in FIG. 7, the first entry of the updated in-memory HRR table 702 may include the lowest FBC, which, in this example, corresponds to the second set of read thresholds; the second entry may include the next lowest FBC, which, in this example, corresponds to the first set of read thresholds; and the $N^{th}$ entry may include the highest FBC, which, in this example, corresponds to the third set of read thresholds.

Referring back to FIG. 5, the in-memory HRR update logic 510 may be further operable to notify the memory controller 504 to update the in-controller HRR table 520 based on the updates to the in-memory HRR table 512. For example, the in-memory HRR update logic 510 may send the information associated with the updated in-memory HRR table 512 to the HRR update logic 518 in a notification message 524. As an example, the notification message 524 may include updated order of the HRR indices in the order of increasing FBC, as shown in FIG. 7.

The memory controller 504 may be operable to update the in-controller HRR table 520 based on the update to the in-memory HRR table 512. For example, the memory controller 504 may update the in-controller HRR table 520 to include the updated values of the HRR index 708 that match the values of the HRR index 208 for each entry of the in-controller HRR table 520. The memory controller 504 may also be operable to perform a subsequent read of the memory device 502 using a set of read thresholds corresponding to the first entry of the updated in-controller HRR table 520. For example, the memory controller 504 may perform the subsequent read by providing an index stored in the first entry of the updated in-controller HRR table 520 to the memory device 502 to retrieve the set of read thresholds from the read thresholds table 514 stored in the memory device 502. Thus, for the example described in FIG. 7, the memory controller 504 may provide the value 2 of the HRR index 208 to retrieve the second set of read thresholds from the read thresholds table 704.

In some examples, the memory controller 504 may determine that the subsequent read operation contains uncorrectable errors. For example, the decoder 516 may compute the FBC for the data read from the memory 506 and provide a fail status to the HRR update logic 518. In this case, the HRR update logic 518 may perform read retry attempts in the order of entries of the in-controller HRR table 520, as described with reference to FIG. 3. For example, the HRR update logic 518 may perform a read retry attempt using the first set of read thresholds corresponding to the value 1 of the HRR index 208 in the second entry of the in-controller HRR table 520. Thus, the HRR update logic 518 may update the in-controller HRR table 520, as described with reference to FIG. 3.

Figure 8:
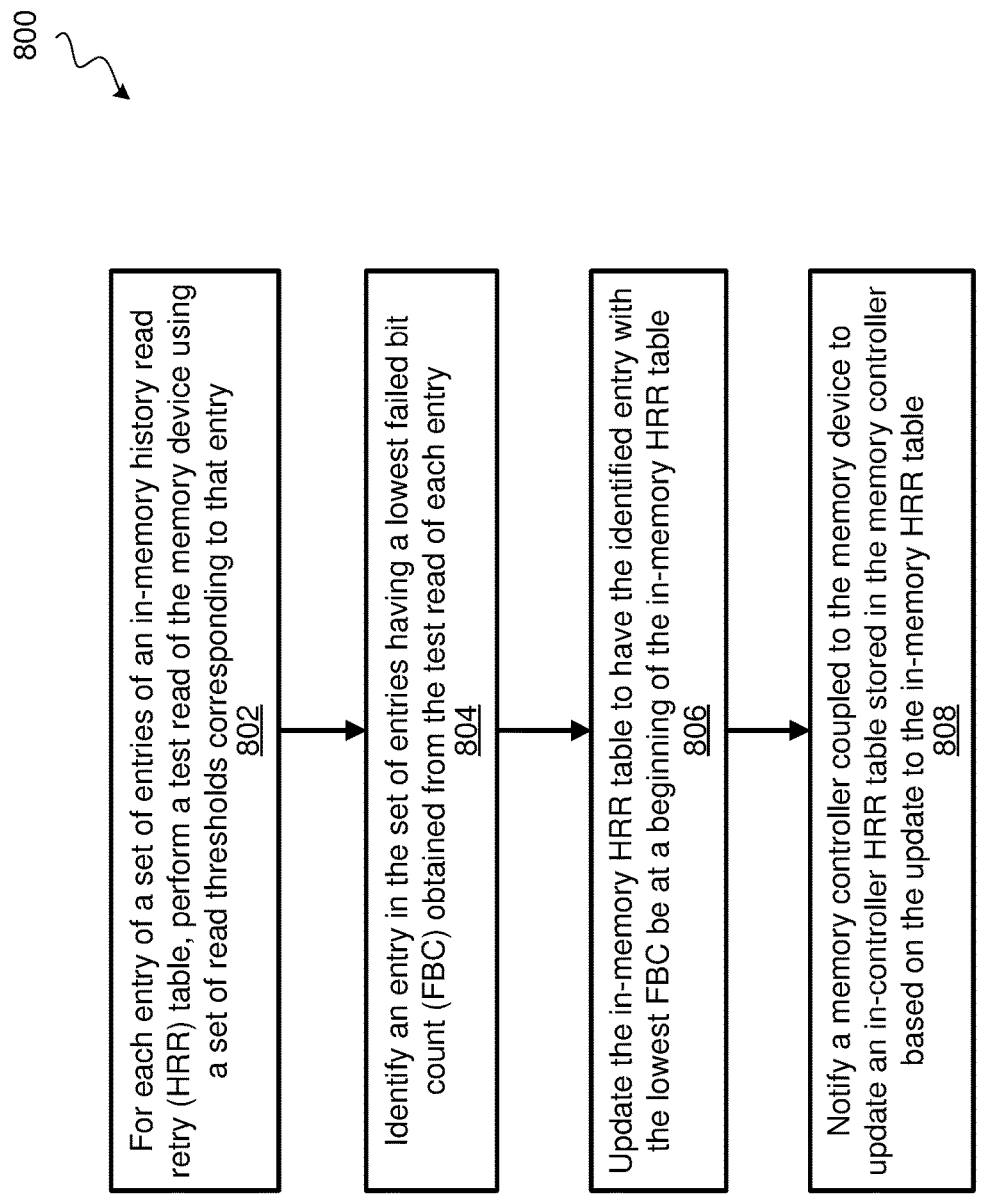
FIG. 8 illustrates a flow diagram of an example of a process for performing in-memory read threshold adaptation by a memory device of a storage device, according to some embodiments.

FIG. 8 illustrates a flow diagram of an example of a process 800 for performing in-memory read threshold adaptation by a memory device of a storage device, according to some embodiments. Process 800 can be performed, for example, by the memory device 502, which is coupled to the memory controller 504 in the storage device 500.

Process 800 may begin at block 802 by performing, for each entry of a set of entries of an in-memory HRR table, a test read of the memory device using a set of read thresholds corresponding to that entry. Using FIG. 5 as an example, the memory device 502 may perform a test read of the memory 506 (e.g., a memory page) for each entry of the N entries of the in-memory HRR table 512 using a set of read thresholds corresponding to that entry. The in-memory HRR table 512 may initially include default values of the HRR index 708 as shown in the HRR table 202. The in-memory HRR update logic 510 may perform the test reads of the memory 506 for each of the $k^{th}$ entry, as described with reference to blocks 604-616 for the process 600.

At block 804, the memory device may identify an entry in the set of entries having a lowest FBC obtained from the test read of each entry. By way of example, the in-memory HRR update logic 510 may identify the second entry (with index value of 2) in the set of N entries as having the lowest FBC computed by the in-memory decoder 508 from the test read of each of the N entries, as described with reference to FIG. 6.

At block 806, the memory device may update the in-memory HRR table to have the identified entry with the lowest FBC be at a beginning of the in-memory HRR table. Updating the in-memory HRR table may include moving an entry to the beginning of the in-memory HRR table in response to the test read of that entry having a lower FBC than a first entry of the in-memory HRR table when the test read is performed. Continuing with the example above, the in-memory HRR update logic 510 may determine that the second entry (with index value of 2) has a lower FBC than the FBC of the first entry, and update the in-memory HRR table 512 to have the second entry be at the beginning of the in-memory HRR table 512. The rest of the entries may have a higher FBC, and thus the entry containing the index value of 2 remains at the beginning of the in-memory HRR table 512. As shown in FIG. 7, the in-memory HRR table 702 includes the updated HRR index 708 for the in-memory HRR table 512 having the value 2 for the second entry in the beginning of the in-memory HRR table 702. The updated in-memory HRR table 702 may include the entries in the order of increasing FBC.

At block 808, the memory device may notify the memory controller to update an in-controller HRR table stored in the memory controller based on the update to the in-memory HRR table. The in-memory HRR update logic 510 may notify the memory controller 504 to update the in-controller HRR table 520 based on the update to the in-memory HRR table 512. In some examples, the-memory HRR update logic 510 may send the order of the HRR indices of the updated in-memory HRR table 702 in the notification message 524 to update the in-controller HRR table 520. The memory controller 504 may update the in-controller HRR table 520 based on the updates to the in-memory HRR table 512. For example, the memory controller 504 may update the HRR index 208 for each entry of the controller HRR table 520 to match with the HRR index 708 for each corresponding entry of the in-memory HRR table 702.

The memory controller 504 may perform a subsequent read of the memory device 502 using a set of read thresholds corresponding to a first entry of the updated in-controller HRR table 520. Thus, in the example above, the memory controller 504 may perform a subsequent read of the memory device 502 using the second set of read thresholds corresponding to the value 2 of the HRR index 208 in the updated in-controller HRR table 520. The memory controller 504 may provide an index value of 2 stored in the first entry of the updated in-controller HRR table 520 to the memory device 502 to retrieve the second set of read thresholds from the read thresholds table 504. If the subsequent read operation contains uncorrectable error as determined by the decoder 516, the memory controller 504 may perform read retry attempts in order of entries of the updated in-controller HRR table 520. Thus, the memory controller 504 may perform another read of the memory device 502 using the first set of read thresholds corresponding to the value 1 of the HRR index 208 in the updated in-controller HRR table 520.

Thus, the techniques described herein can provide systems and methods to maintain the high QoS of the memory device by supporting proactive HRR adaptation in the memory device that includes performing background test reads using the in-memory HRR table. The in-memory HRR table can be updated based on the FBC computed by an in-memory decoder from the test read data by reordering the entries in the order of increasing FBC starting with the first entry. The in-controller HRR table can be updated using a small amount of data transfer to transfer the order of indices from the memory device, and the updated in-controller HRR table can be used for subsequent read operations that can minimize first read failures.

Figure 9:
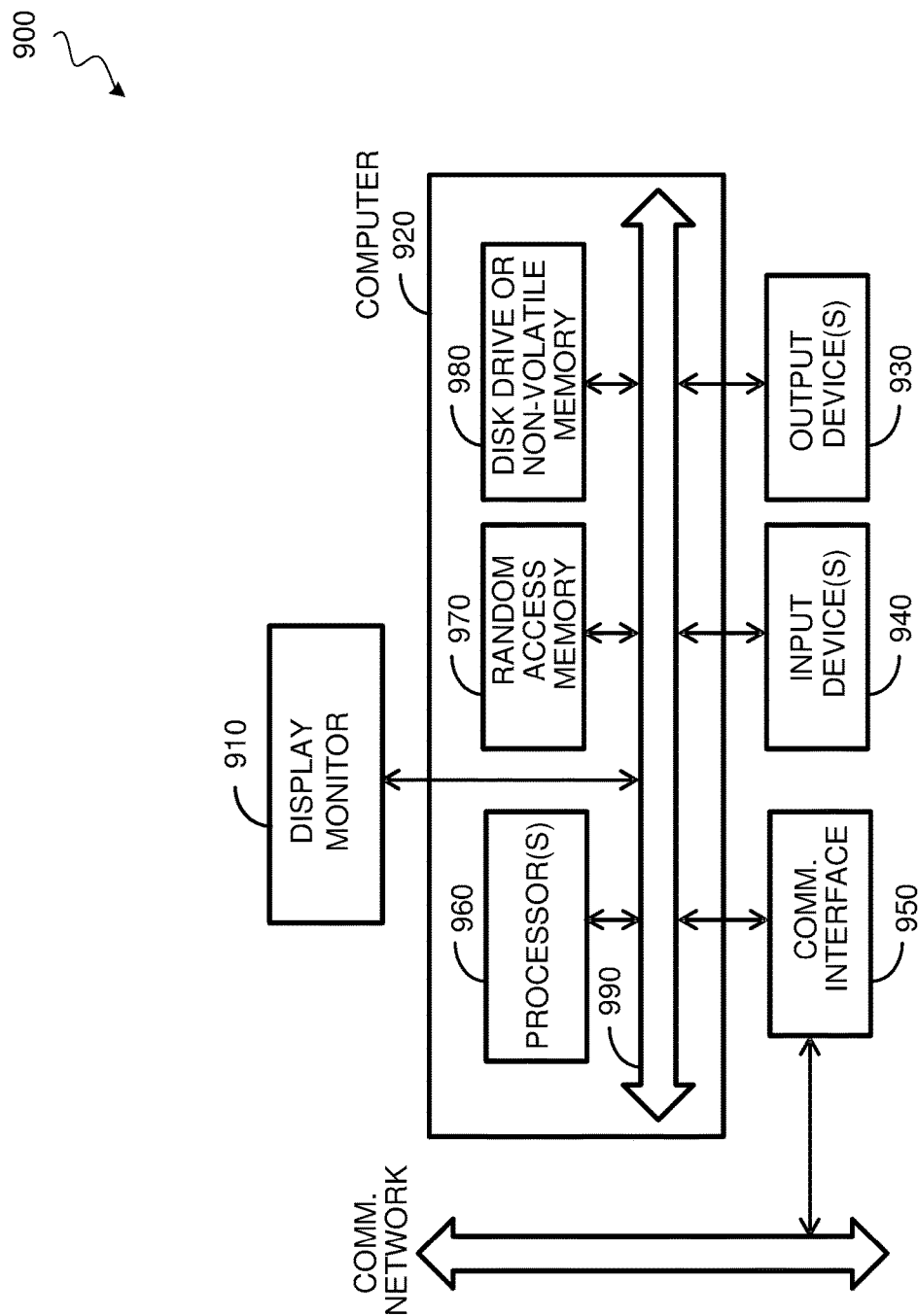
FIG. 9 illustrates a block diagram of a computer system, according to some embodiments.

FIG. 9 illustrates a computer system 900 usable for implementing one or more embodiments of the present disclosure. FIG. 9 is merely an example and does not limit the scope of the disclosure as recited in the claims. As shown in FIG. 9, the computer system 900 may include a display monitor 910, a computer 920, user output devices 930, user input devices 940, a communications interface 950, and/or other computer hardware or accessories.

As shown in FIG. 9, the computer 920 may include one or more processors 960 that communicate with a number of peripheral devices via a bus subsystem 990. These peripheral devices may include the user output devices 930, the user input devices 940, the communications interface 950, and a storage subsystem, such as a random-access memory (RAM) 970 and a disk drive or non-volatile memory 980.

The user input devices 940 include all possible types of devices and mechanisms for inputting information to the computer 920. These may include a keyboard, a keypad, a touch screen incorporated into the display, audio input devices such as voice recognition systems, microphones, and other types of input devices. In various embodiments, the user input devices 940 are typically embodied as a computer mouse, a trackball, a track pad, a joystick, a wireless remote, a drawing tablet, a voice command system, an eye tracking system, and the like. The user input devices 940 typically allow a user to select objects, icons, text and the like that appear on the monitor 912 via a command such as a click of a button or the like.

The user output devices 930 include all possible types of devices and mechanisms for outputting information from the computer 920. These may include a display (e.g., the monitor 910), non-visual displays such as audio output devices, etc.

The communications interface 950 provides an interface to other communication networks and devices. The communications interface 950 may serve as an interface for receiving data from and transmitting data to other systems. Embodiments of the communications interface 950 typically include an Ethernet card, a modem (telephone, satellite, cable, ISDN), (asynchronous) digital subscriber line (DSL) unit, FireWire interface, USB interface, and the like. For example, the communications interface 950 may be coupled to a computer network, to a FireWire bus, or the like. In other embodiments, the communications interfaces 950 may be physically integrated on the motherboard of the computer 920, and may be a software program, such as soft DSL, or the like.

In various embodiments, the computer system 900 may also include software that enables communications over a network such as the HTTP, TCP/IP, RTP/RTSP protocols, and the like. In alternative embodiments of the present disclosure, other communications software and transfer protocols may also be used, for example IPX, UDP or the like.

The RAM 970 and the disk drive 980 are examples of tangible media configured to store data such as embodiments of the present disclosure, including executable computer code, human readable code, or the like. Other types of tangible media include floppy disks, removable hard disks, optical storage media such as CD-ROMS, DVDs and bar codes, semiconductor memories such as flash memories, non-transitory read-only-memories (ROMS), battery-backed volatile memories, networked storage devices, and the like. The RAM 970 and the disk drive 980 may be configured to store the basic programming and data constructs that provide the functionality of the present disclosure.

Software code modules and instructions that provide the functionality of the present disclosure may be stored in the RAM 970 and the disk drive 980. These software modules may be executed by the processor(s) 960. The RAM 970 and the disk drive 980 may also provide a repository for storing data used in accordance with the present disclosure.

The RAM 970 and the disk drive 980 may include a number of memories including a main random-access memory (RAM) for storage of instructions and data during program execution and a read-only memory (ROM) in which fixed non-transitory instructions are stored. The RAM 970 and the disk drive 1080 may include a file storage subsystem providing persistent (non-volatile) storage for program and data files. The RAM 970 and the disk drive 980 may also include removable storage systems, such as removable flash memory. As described previously, various embodiments described herein can be used to maintain the high QoS of the flash memory and improve the system performance.

The bus subsystem 990 provides a mechanism for letting the various components and subsystems of the computer 920 communicate with each other as intended. Although the bus subsystem 990 is shown schematically as a single bus, alternative embodiments of the bus subsystem may utilize multiple busses.

It will be readily apparent to one of ordinary skill in the art that many other hardware and software configurations are suitable for use with the present disclosure. For example, the computer 920 may be a desktop, portable, rack-mounted, or tablet configuration. Additionally, the computer 920 may be a series of networked computers. In still other embodiments, the techniques described above may be implemented upon a chip or an auxiliary processing board.

Various embodiments of the present disclosure can be implemented in the form of logic in software or hardware or a combination of both. The logic may be stored in a computer-readable or machine-readable non-transitory storage medium as a set of instructions adapted to direct a processor of a computer system to perform a set of steps disclosed in embodiments of the present disclosure. The logic may form part of a computer program product adapted to direct an information-processing device to perform a set of steps disclosed in embodiments of the present disclosure. Based on the disclosure and teachings provided herein, a person of ordinary skill in the art will appreciate other ways and/or methods to implement the present disclosure.

The data structures and code described herein may be partially or fully stored on a computer-readable storage medium and/or a hardware module and/or hardware apparatus. A computer-readable storage medium includes, but is not limited to, volatile memory, non-volatile memory, and magnetic and optical storage devices, such as disk drives, magnetic tape, CDs, DVDs, or other media, now known or later developed, that are capable of storing code and/or data. Hardware modules or apparatuses described herein include, but are not limited to, ASICs, FPGAs, dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

The embodiments disclosed herein are not to be limited in scope by the specific embodiments described herein. Various modifications of the embodiments of the present disclosure, in addition to those described herein, will be apparent to those of ordinary skill in the art from the foregoing description and accompanying drawings. Further, although some of the embodiments of the present disclosure have been described in the context of a particular implementation in a particular environment for a particular purpose, those of ordinary skill in the art will recognize that the disclosure's usefulness is not limited thereto and that the embodiments of the present disclosure can be beneficially implemented in any number of environments for any number of purposes.

What is Claimed is:

1. A method performed by a memory device of a storage device that includes a memory controller coupled to the memory device, the method comprising:
   performing, for each entry of a set of entries of an in-memory history read retry (HRR) table, a test read of the memory device using a set of read thresholds corresponding to that entry;
   identifying an entry in the set of entries having a lowest failed bit count (FBC) obtained from the test read of each entry;
   updating the in-memory HRR table to have the identified entry with the lowest FBC be at a beginning of the in-memory HRR table; and
   notifying the memory controller to update an in-controller HRR table stored in the memory controller based on the update to the in-memory HRR table, wherein each entry in the in-controller HRR table stores an index that references a corresponding set of read thresholds in a read thresholds table stored in the memory device.

2. The method of claim 1, wherein updating the in-memory HRR table includes moving an entry to the beginning of the in-memory HRR table in response to the test read of that entry having a lower FBC than a first entry of the in-memory HRR table when the test read is performed.

3. The method of claim 1, wherein the memory controller updates the in-controller HRR table based on the update to the in-memory HRR table, and performs a subsequent read of the memory device using a set of read thresholds corresponding to a first entry of the updated in-controller HRR table.

4. The method of claim 3, wherein the memory controller performs the subsequent read by providing an index stored in the first entry of the updated in-controller HRR table to the memory device to retrieve the set of read thresholds from the read thresholds table stored in the memory device.

5. The method of claim 3, wherein the memory controller determines that the subsequent read operation contains uncorrectable errors, and performs read retry attempts in order of entries of the updated in-controller HRR table.

6. The method of claim 5, wherein the memory controller reorders the entries of the in-controller HRR table in response to determining that the subsequent read operation contains uncorrectable errors.

7. The method of claim 1, wherein the memory device includes an in-memory decoder to determine the FBC of the test read.

8. The method of claim 1, wherein the memory device notifies the memory controller of updates to the in-memory HRR table at a periodic interval.

9. The method of claim 1, wherein the memory device includes a plurality of memory blocks, and each memory block has at least one corresponding in-memory HRR table.

10. The method of claim 1, wherein the memory device performs the test read as a background process when no command is received from the memory controller.

11. A storage device comprising:
    a memory controller having an in-controller history read retry (HRR) table; and
    a memory device coupled to the memory controller, the memory device having:
      a read thresholds table;
      an in-memory HRR table; and
      HRR update logic operable to:
        perform, for each entry of a set of entries of the in-memory HRR table, a test read of the memory device using a set of read thresholds corresponding to that entry;
        identify an entry in the set of entries having a lowest failed bit count (FBC) obtained from the test read of each entry;
        update the in-memory HRR table to have the identified entry with the lowest FBC be at a beginning of the in-memory HRR table; and
        notify the memory controller to update the in-controller HRR table based on the update to the in-memory HRR table,
    wherein each entry in the in-controller HRR table stores an index that references a corresponding set of read thresholds in the read thresholds table stored in the memory device.

12. The storage device of claim 11, wherein the in-memory HRR table is updated by moving an entry to the beginning of the in-memory HRR table in response to the test read of that entry having a lower FBC than a first entry of the in-memory HRR table when the test read is performed.

13. The storage device of claim 11, wherein the memory controller is operable to:
    update the in-controller HRR table based on the update to the in-memory HRR table; and
    perform a subsequent read of the memory device using a set of read thresholds corresponding to a first entry of the updated in-controller HRR table.

14. The storage device of claim 13, wherein the memory controller is operable to perform the subsequent read by providing an index stored in the first entry of the updated in-controller HRR table to the memory device to retrieve the set of read thresholds from the read thresholds table stored in the memory device.

15. The storage device of claim 13, wherein the memory controller is operable to:
- determine that the subsequent read operation contains uncorrectable errors; and
- perform read retry attempts in order of entries of the in-controller HRR table.

16. The storage device of claim 15, wherein the memory controller is operable to reorder the entries of the in-controller HRR table in response to determining that the subsequent read operation contains uncorrectable errors.

17. The storage device of claim 11, wherein the memory device further includes an in-memory decoder to determine the FBC of the test read.

18. The storage device of claim 11, wherein the memory device is operable to notify the memory controller of updates to the in-memory HRR table at a periodic interval.

19. The storage device of claim 11, wherein the memory device includes a plurality of memory blocks, and each memory block has at least one corresponding in-memory HRR table.

20. The storage device of claim 11, wherein the memory device is operable to perform the test read as a background process when no command is received from the memory controller.

* * * * *